Inventor:
William E. Glenn, Jr,
by Richard R. Brainard
His Attorney.

Inventor:
William E. Glenn, Jr.,
by Richard R. Brainard
His Attorney.

Inventor:
William E. Glenn, Jr.,
by Richard R. Brainard
His Attorney.

United States Patent Office 3,118,969
Patented Jan. 21, 1964

3,118,969
COLOR PROJECTION SYSTEM

William E. Glenn, Jr., Scotia, N.Y., assignor to General Electric Company, a corporation of New York Filed Aug. 21, 1959, Ser. No. 835,208
14 Claims. (Cl. 178—5.4)

Figure 1:
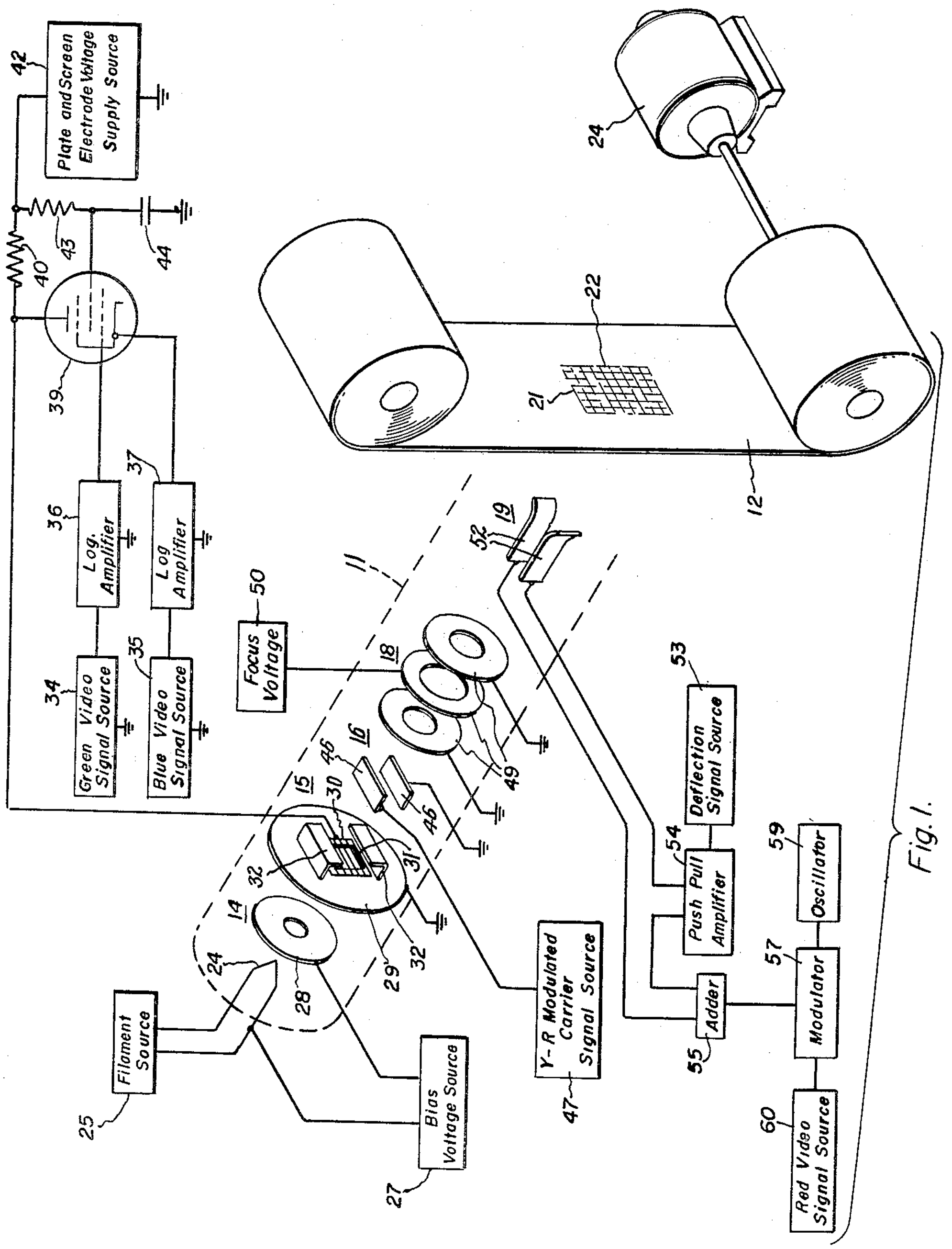

The present invention relates to a system for projecting colored light as a function of the parameters of diffraction gratings in a light modulating medium.

In my Patent No. 2,813,146, granted November 12, 1957, and assigned to the assignee of the present invention, a projection system is described and claimed that, in a preferred embodiment, projects color pictures in response to applied color television signals. In this system an electron beam, modulated by the applied color television signals, deflects over the surface of a deformable light modulating medium on which it produces a plurality of charge patterns, each comprising lines of electron charge. The separations of the lines of charge for each charge pattern are a function of a different primary color and their charge densities correspond to the intensity of the respective color light for the correspondingly positioned picture elements. A grounded conducting plane, placed beneath the light modulating medium, attracts the electrons in the charge patterns, so that they press in on the deformable light modulating medium thereby producing corresponding lines of deformations, the depths of which depend upon the charge densities. Each set of the lines of deformations formed by each charge pattern forms a phase diffraction grating.

Light cast on the surface of the light modulating medium is diffracted by the diffraction gratings. The resulting diffracted light is masked such that substantially only colors corresponding to the respective diffraction gratings are transmitted to a projection screen where they produce a color image of the televised scene to which the applied color television signals correspond. The present invention is an improvement over this color television system.

Accordingly, an object of the present invention is to provide an improved color projection system.

In my patented color system, the openings in the light mask must be sufficiently narrow to transmit substantially only one color of the light diffracted by each of the diffraction gratings. Of course, the transmitted color is different for each diffraction grating. Since this one color must be transmitted while the other colored light, diffracted by the same diffraction grating, is masked, the openings in the light mask must be very narrow. And with narrow openings, the light transmitted to the screen is correspondingly small. The result is that the projected colored light is not as bright as it would be if the openings were wider.

Thus, another object is to provide a color projection system that transmits a large magnitude of colored light as a function of the parameters of diffraction gratings in a light modulating medium.

Narrow openings in the light mask have another disadvantage. A relatively large number of grating lines must be used in each picture element for maximum intensity of the desired colored light through the narrow openings. With many lines in a small space, the resolution of the grating lines, and thus of the electron beam that forms the charge patterns must be high. The higher the required resolution of the electron beam, the more stringent the requirements on the electron gun structure and on the magnitudes of the voltages energizing the electrodes in the electron gun.

Hence, a further object is to provide a color projection system in which relatively low resolution of the electron beam can be tolerated.

In my prior color system, the openings in the light mask transmit some of the second order diffracted light diffracted by the diffraction grating corresponding to the red light intensity. This second ordered diffracted light is undesired since it is in the green region where the eye is very sensitive and thus it desaturates the projected red light. The red color purity could be significantly improved if this second order diffracted light could be eliminated.

Therefore, another object of the present invention is to provide a color projection system that projects red light with high color purity.

These and other objects are obtained in a preferred embodiment of my invention in which two orthogonally arranged diffraction gratings are formed in the light modulating medium. One of these gratings corresponds to the red light and the other to the remaining light in the televised scene. A light masking system is provided having two masking sections, each of which has two sets of openings extending at right angles to one another. One of the masking sections masks the light before it is cast on the deformable medium and the other masks the diffracted light. The two diffraction gratings have grating lines parallel, respectively, to the two sets of openings in the two masking sections. Dichroic mirrors are arranged to direct red light through one set of openings in the first masking section and the remaining cyan light through the other set of openings. With this arrangement, the diffraction grating corresponding to the red light diffracts only the red light from the one set of openings while the other diffraction grating diffracts only the cyan light from the other set of openings. The manner in which this structure obtains the above-mentioned objects is explained below.

With this system the light masking associated with the single color component is not required to accomplish color selection and, accordingly, the spacings between the bars of the masking system may be made of greater dimensions and the amount of light and resolution are accordingly greater. Since the masking system associated with the other diffraction pattern containing both the color component and intensity information for the remaining colored light to be projected is required to select from less than all the colors of white light the selection requirements on the masking system are less stringent. This is particularly true in a system of this type where green is the color transmitted through the separate masking system and magenta (white light minus green light) is transmitted through the medium bearing the grating or gratings corresponding to the red and blue color components. In such a system additional advantages result from the fact that more of the color information in the scene to be projected is contained in the green signal than in any other component color and the fact that the wavelength of the red and blue components are separated by a greater amount than the green and blue, for example. The requirements of the masking system in selectively transmitting light in accordance with the red and blue information is accordingly less stringent than it is in a system employing the green and blue components as the color information contained in one set of diffraction patterns.

Figures 2, 3:
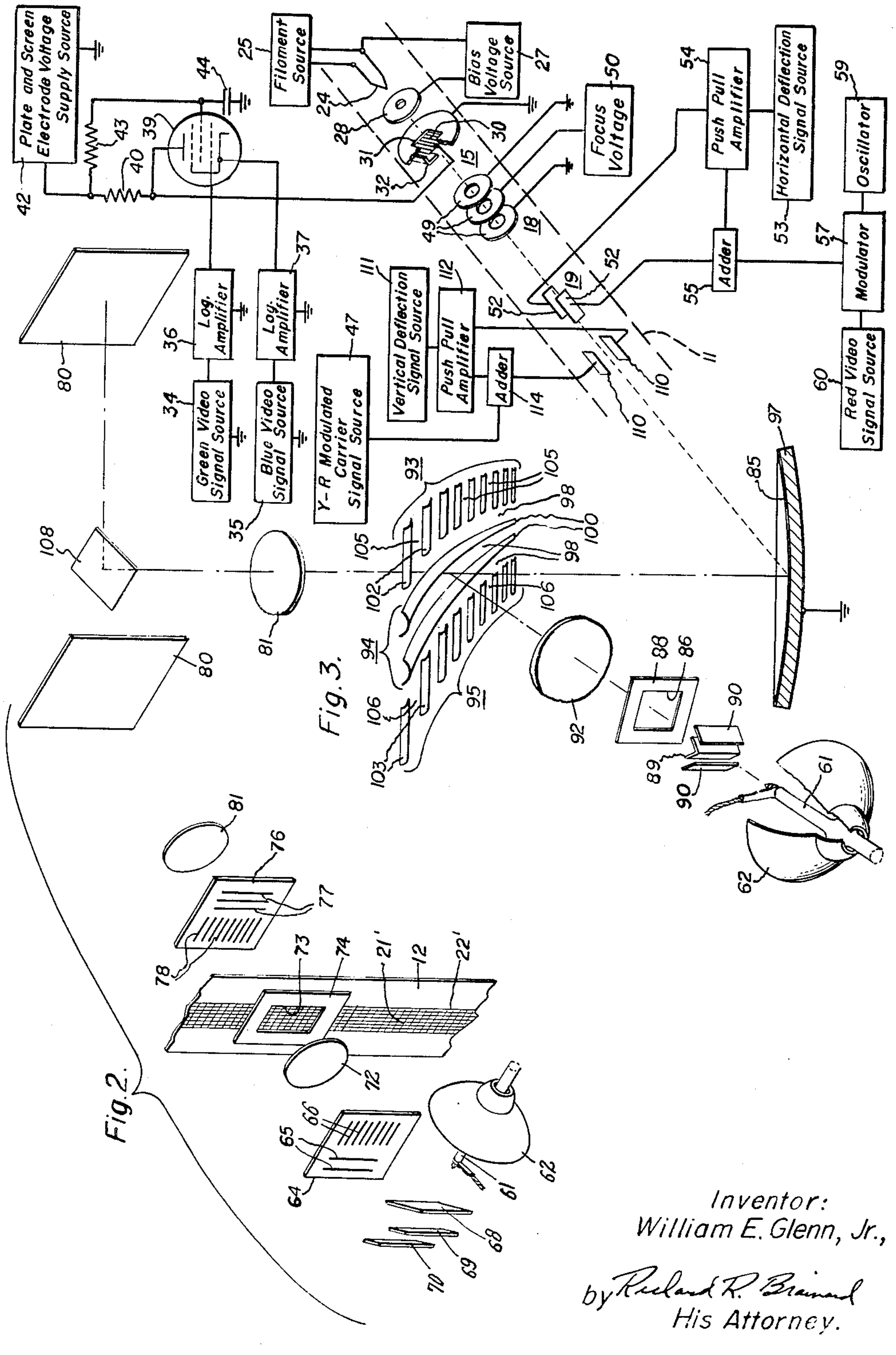
Figure 4:
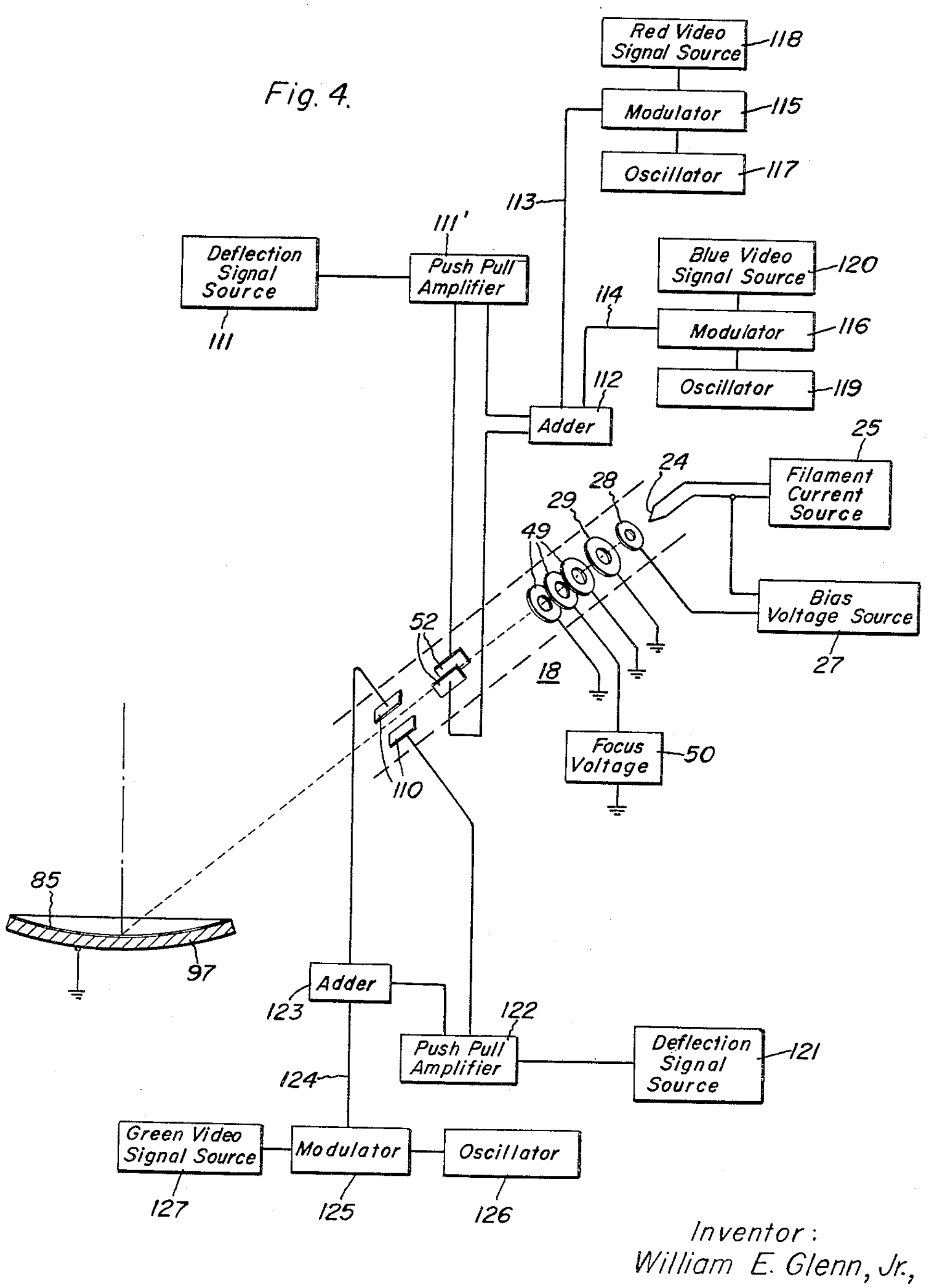

The novel features believed characteristic of the invention are set forth in the appended claims. The invention itself, together with further objects and advantages thereof, may best be understood by reference to the following description, taken in connection with the accompanying drawings, in which:

FIG. 1 is an illustration of an electron gun for forming two orthogonally arranged diffraction gratings on a light modulating medium of the movable type, FIG. 2 is a schematic illustration of a transmission-type embodiment of my invention, FIG. 3 is a schematic illustration of a reflection-type embodiment of my invention in which the light modulating medium is of the fixed type, and FIG. 4 is a schematic illustration of a modified reflection-type system embodying my invention.

The electron writing system disclosed in FIG. 1 is of the type described and claimed in my copending application, Serial No. 799,295, filed November 13, 1959, a continuation-in-part of my application Serial No. 782,955, filed December 24, 1958, and which is assigned to the assignee of the present invention. This electron writing system, which is enclosed in an evacuated enclosure 11, produces phase diffraction gratings in a light modulating medium 12 that is also enclosed in an evacuated enclosure (not illustrated) connected to enclosure 11. Medium 12 may be a transparent tape with a thermoplastic surface such as is described and claimed in my copending application, Serial No. 84,824, filed January 23, 1961, a division of my copending application Serial No. 8,842, filed February 15, 1960, as a continuation-in-part of my copending application Serial No. 783,584, filed December 29, 1958 (now abandoned) and my copending application Serial No. 698,167, filed November 22, 1957 (now abandoned). All of said applications are assigned to the assignee of the present invention. One especially suitable tape has a Mylar base coated with cuprous iodide to which a thin film of polystyrene of medium molecular weight is adhered. In addition to thermoplastic-coated material, medium 12 may be any movable material that, when subject to an electron charge or beam, changes in physical characteristics, such as transparency or surface irregularity, affecting the transmission or reflection of light.

The principal components of the electron writing system are an electron gun assembly 14, a beam-splitting means 15, a charge density control means 16, a focusing system 18, and a deflection system 19.

In the operation of the electron writing system, the electron gun assembly 14 produces an electron beam that is split, or in other words divided, by beam-splitting means 15 into a plurality of initially convergent electron beams. They are made to converge at angles such that they strike the thermoplastic surface of medium 12 at points vertically separated by distances equal to the grating spacings of a diffraction grating that corresponds to the combined green and blue color content of the televised scene, if this system is used in a television application. These beams, when deflected in a direction orthogonal to the movement of tape 12, form lines of electron charge, the densities of which are controlled by charge density control means 16, which controls the widths of these lines and also their densities since the number of electrons in each line remains substantially the same irrespective of the line widths.

Each of the electron beams is focused by focusing system 18 to an individual, approximately round spot on the surface of medium 12.

Deflection system 19 produces horizontal movement between the electron beams and light modulating medium 12. It does not deflect the beams linearly but rather in steps separated by distances on medium 12 that are functions of the desired red diffraction grating spacing. The dwell of the beams at each step, and thus the magnitude of electron charge produced there, is a function of the instantaneous amplitude of the red color content of the televised scene. In other words, the horizontal deflection is velocity modulated in accordance with the red video signal.

Lines of electron charge 21 and 22 are produced by the deflected electron beams. As the vertically-spaced beams deflect horizontally across medium 12, they produce horizontally extending lines of charge 21 and at the same time, due to the stepping action of the deflection, they produce vertically extending lines 22 of charge. The separations between the vertical lines of charge 22 is fixed but those between the horizontal lines of charge 21 depend upon the instantaneous blue and green color content of the televised scene.

The lines of charge 21 and 22 produce the desired diffraction gratings. When the thermoplastic surface of medium 12 is heated to a plastic condition, by means not shown, these lines of charge deform the surface, forming a red diffraction grating with grating lines corresponding to the charge lines 22 and a diffraction grating, referred to hereinafter as a variable color diffraction grating, having grating lines corresponding to the charge lines 21.

Vertical movement of medium 12 is required to extend the diffraction gratings along the length of medium 12. This movement is provided by a motor 24, which for television applications, moves medium 12 at a rate corresponding to the vertical deflection rate—60 fields per second. Separate frames are formed on medium 12, each corresponding to a field of the televised signal. Likewise, in television applications, the deflection action of deflection system 19 is at the horizontal television horizontal deflection rate of 15,750 lines per second.

In the foregoing discussion, only the principal components of a suitable electron writing system have been described. Following is a detailed description of this electron writing system which utilizes beam splitting. A detailed description of electron beam splitting systems is also presented and is claimed in my copending application, Serial No. 782,958, filed December 24, 1958, now Patent No. 3,065,295, dated November 20, 1962, and assigned to the assignee of the present invention.

Referring to the components of FIG. 1 in more detail, the electron gun assembly 14 comprises a point source of electron beam, a hairpin filament 24, that is heated by electrical energy supplied from a source 25, and that is maintained at a highly negative potential with respect to ground by voltage supplied from a bias voltage source 27. This source also supplies a bias voltage to a control electrode 28 for determining the magnitude of the beam current. In television applications, control electrode 28 is also energized, after each deflection of the beams, by a blanking signal that may be provided by a conventional blanking signal circuit (not shown). Ground potential applied to an anode 29 determines the beam voltage.

The optimum beam current and voltage depend upon the particular characteristics of the electron writing system in which the beam is used. Some of the factors to be considered are the nature of the thermoplastic coating and the width of medium 12, the length of the electron writing system, the bandwidth of the modulating signals, the raster size and the desired resolution. In some applications, the electron beam may have a magnitude of the order of 10 microamps at an acceleration potential of approximately 8 to 15 kilovolts.

The beam splitting means 15 includes a plurality of small diameter wires 30 extending horizontally across an aperture 31 in anode 29. The number of wires 30 in a typical application may be 75, but those subtended or intercepted by the beam may be only 3 or 4 or 5 wires near the center of the wire arrangement. By the use of a large aperture 31 and a large number of wires 30, electric fields produced in the vicinity of the beam are more homogeneous. The potential gradient region between wires 30 and anode 29 is extended by two electrodes 32 connected to anode 29.

The wires 30 are maintained at a varying potential with respect to anode 29 of several hundred volts positive, the instantaneous magnitude of which depends upon the instantaneous green and blue color intensities in the televised picture. For reasons explained below, this voltage is made equal to the sum of a constant and the logarithm of the ratio of the blue to green television signals.

The circuit providing this variable voltage includes sources 34 and 35 of green and blue video signals, respectively, that provide voltages of increasing amplitude when the green and blue color intensities increase. Circuit details are not illustrated since the sources may correspond to the video circuits in a color television camera or receiver. In those television circuits in which the signals decrease for increasing color intensities, the desired signals may be obtained by phase inversion.

The circuit components for converting these green and blue video signals to the desired logarithmic form comprise two logarithmic amplifiers 36 and 37 and a pentode circuit having a pentode 39 and a plate resistor 40. The operating direct voltages are applied from a voltage source 42 to the plate resistor 40 and through a screen grid resistor 43 to the screen grid of the tube 39. A capacitor 44 is connected between the screen electrode and the ground. In some applications the available blue and green video signals may have the desired logarithmic characteristics. Then logarithmic amplifiers 36 and 37 may be omitted.

In the operation of this circuit, the green video signal is converted to logarithmic form by amplifier 36 and conducted to the grid electrode of pentode 39, while the blue video signal, after being converted to logarithmic form by logarithmic amplifier 37, is conducted to the cathode electrode. The logarithmic green video signal produces a minus logarithmic signal across resistor 30, while the logarithmic blue video signal produces a positive logarithmic signal. Thus, a difference signal is produced across resistor 40 equal to the logarithm of the blue video signal minus the logarithm of the green video signal. From conventional logarithmic considerations, it is apparent that this difference signal is identical to the logarithm of the ratio of the intensities of the blue and green video signals. This varying signal, which appears at the plate electrode of pentode tube 39 is directly coupled to wires 30.

Since the plate electrode of pentode tube 39 is directly connected to wires 30, a constant potential is also applied to these wires. This potential is a function of the magnitude of resistor 40 as well as of the potential supplied from source 42.

The total signal applied to wires 30 has a varying component, the peak magnitude of which may be of the order of 50 volts and a constant component of the order of 250 volts positive with respect to anode 29. This constant component should correspond to the color produced when the blue and green color intensities are equal, which color, for a conventional color television system, has a wave length of approximately 4930 Angstroms.

Before proceeding with a discussion of the FIG. 1 embodiment, a brief explanation will be given of this variable color optics which is embodied in the system described and claimed in my aforementioned copending application, Serial No. 688,597, filed October 7, 1957, now Patent No. 2,919,302, dated December 29, 1959, and assigned to the assignee of the present invention. In a preferred embodiment, a large range of colors are produced by two diffraction gratings, one corresponding to the red color content and the other to the relative blue and green color content of the televised picture. As is explained in the above application, all of the colors that can be obtained through the combination of the fixed blue, green, and red primary colors of the conventional color television system can also be obtained through use of one fixed primary color, for example, red, and a primary color varying between two colors, for example, blue and green.

To obtain the function for this variable primary color, a line is drawn through the two points on the Commission Internationale d'Eclairage Chromaticity diagram corresponding to the green and blue primary colors of a color television system. Then the colors along this line are plotted against the relative intensities of the blue and green primary colors required to produce the colors along this line. The observed curve is approximately a logarithmic function. That is, the wave length of each color along this line is a function of the logarithm of the ratio of the intensities of the blue to green primary colors that, when added, produce this color. Thus, the blue and green primary color components need not be used individually, but instead, the logarithm of the ratio of their intensities can be utilized to produce a diffraction grating that diverts to the projection screen, light of a color that, when added to red, produces the desired color. For the projection of different colors, the color added to red is different. Consequently, it is called a variable color.

Referring again to FIG. 1, the logarithmic signal, when applied to the wires 30, produces a potential gradient that splits the electron beam into a plurality of beams that strike the surface of medium 12 with vertical separations equal to the grating spacing of the diffraction grating for the variable color. When the green or blue content of the picture changes, the variable color signal changes and thus these separations change.

The density control means 16 includes two deflection plates 46, one of which is grounded and the other of which is energized by a modulated signal from a source 47, which signal comprises a carrier wave modulated by a conventional $Y-R$ television signal. The Y signal is the sum of the intensities of the red, green, and blue video signals while the R signal is the intensity of the red video signal. Thus, the $Y-R$ signal is the sum of the intensities of the green and blue video signals. A $Y-R$ signal is available in conventional color television receivers and camera circuits, and can be applied to the carrier wave in a conventional modulator circuit. The $Y-R$ signal also can be obtained by adding and then inverting the output signals from the green and blue video signal sources 34 and 35. The carrier signal has a much higher frequency than the $Y-R$ signal and may be, for example, greater than 20 megacycles.

The $Y-R$ deflection signal applied to deflection plates 46 controls the charge densities of the charge lines 21 formed by the splitting of the electron beam. It causes the plurality of beams to be directed away from the axis of the focusing system 18 as a function of the magnitude of this $Y-R$ modulated carrier signal. The greater this signal, the greater the distance the beams are displaced from the focusing system axis and thus the greater their defocusing. The defocusing causes the beams to spread on the surface of medium 12, which spreading decreases the charge densities of the horizontally-extending lines of charge 21 as a function of the magnitudes of the green and blue video voltages. Since the amplitude of the variable color diffraction grating formed by the charge lines 21 depends upon the charge densities of these lines, this amplitude also depends upon the magnitudes of the green and blue video signals.

The focusing system 18 which focuses each of the plurality of beams to an individual substantially round spot on the surface of medium 12, is illustrated as an einzel preferably grounded while the intermediate ring is en- lens comprising three rings 49. The end rings 49 are ergized by a voltage of the order of seven kilovolts from a source 50. Either a negative or a positive voltage can provide the lens action, but a negative voltage is preferred since less negative voltage is required due to the decelerating action of the resulting electrical field. The operation of einzel lenses are well known in the art and explanations thereof can be obtained from many standard optic texts.

The deflection system 19 as an electrostatic deflection system with two vertically extending deflection plates 52 arranged on opposite sides of the paths of the electron beams. Plates 52 are energized with a complex signal that, of a color television application includes the conventional horizontal television deflection signal, obtained from a source 53 and which is converted into push-pull form by a push-pull amplifier 54. One of the push-pull signals is added in an adder circuit 55 with a signal obtained from the output of a modulator circuit 57 which modulates a signal from an oscillator 59 with a red video signal from a source 60. The red video signal source 60, which may be the corresponding circuit in a color television receiver or camera, produces a red video signal corresponding directly to the intensity of the red color content of the televised picture. Inverter circuits may have to be included in some color television circuits to invert this signal so that it has the desired correspondence.

The modulated signal, added to the deflection signal, produces velocity modulation of the electron beams. It periodically slows down and speeds the electron beams at a rate determined by the frequency of operation of oscillator 59. At the points on medium 12 corresponding to times when the beams are slowed down, an increased charge is produced due to the slowing down of the electron beams, and this increased charge forms the charge lines 22. The frequency of operation of oscillator 59 is adjusted so that the separations between the charge lines 22 are equal to the desired red grating spacing. A typical value for its frequency is 10 megacycles for standard video bandwidth pictures.

The red video signal content of the modulated signal determines the charge densities of the lines 22 because it determines the length of dwell of the electron beams at their points of slowdown. In other words, the greater the amplitude of the red video signal, the slower the beams move at their points of slowest movement. In fact, in some cases the beams may be even made to stop. Since the densities of the charge lines 22 are controlled by the amplitude of the red video signal and since the amplitude of the resulting red diffraction grating depends upon the charge densities of lines 22, the amplitude of the red diffraction grating depends upon the magnitude of the red color component of the televised picture, which is, of course, the desired condition.

Although the system of FIG. 1 is illustrated as forming diffraction gratings with grating lines parallel to and normal to the sides of modulating medium 12, these grating lines may be formed at other angles with respect to these sides by merely changing the direction of movement of medium 12. It is only important that the grating lines for the red diffraction grating and the variable color grating be at right angles to one another.

In FIG. 2, there is illustrated a system for transducing into a color image on a projection screen, information in the form of normally extending diffraction gratings 21′ and 22′ on medium 12, formed by the charge lines 21 and 22, respectively. A light beam containing at least the colors corresponding to the diffraction gratings in medium 12 is produced by a light source, illustrated as a xenon-arc lamp, and focused by an ellipsoidal mirror 62 on a first masking means illustrated as an opaque rectangular shaped member 64 in which first and second sets 65 and 66 of transparent areas are othogonally arranged.

Transparent areas 65, which may be parallel, rectangular shaped slits in member 64, extend in a direction parallel to the grating lines 22′ of the red diffraction grating, while the transparent areas 66 extend in a direction parallel to the grating lines 21′ of the variable color diffraction grating. In one application, areas 65 had widths of 230 mils and center-to-center spacings of 500 mils and areas 66 had widths of 25 mils with center-to-center spacings of 75 mils. Three areas 65 and ten areas 66 were used.

Not all of the light produced by the light source 61 is incident on both sets of transparent areas 65 and 66. The colors of the incident light are controlled by a dichroic mirror arrangement comprising three mirrors in which one dichroic mirror 68 is positioned to reflect cyan light on the transparent areas 66. That is, it is designed to reflect all but the red light, which it transmits. Thus, the light incident on transparent areas 66 and transmitted by them is the colored light other than the red light, i.e., cyan light. The red light transmitted by mirror 68 is incident on two mirrors 69 and 70 that reflect red light while transmitting the infrared light. The infrared light serves no purpose since it cannot be seen and, if reflected, heats the modulating medium 12, which is generally undesired. However, if this heating can be tolerated, mirrors 69 and 70 can be ordinary reflecting mirrors that reflect most of the light incident upon them. Mirror 69 is positioned to reflect onto the centermost transparent area 65, half of the red light transmitted by mirror 68 while mirror 70 is positioned to reflect the other half of the red light transmitted by mirror 68 onto the other transparent area 65. This arrangement of two red reflecting mirrors is more efficient than one with a single mirror, since a single mirror would reflect a great portion of the red light onto the opaque region between areas 65. But with two mirrors 69 and 70, the amount of light incident on this intermediate opaque region is kept to a minimum. Mirrors 68, 69, and 70 may be placed adjacent member 64.

The light transmitted by transparent areas 65 and 66 is focused by a lens system 72 on a second masking means after being transmitted by medium 12 and an aperture 73 in an opaque frame 74. The second masking means comprises a rectangular-shaped, opaque member 76 in which two sets of transparent areas 77 and 78 extend parallel, respectively, to the transparent areas 65 and 66 in the first masking means. One more transparent area of each type is utilized in the second masking means to enable the focusing of the light from the transparent areas in the first masking means between the transparent areas in the second masking means.

When there are no diffraction gratings in medium 12 with grating lines 22′ parallel to transparent areas 65 and 77, the light transmitted by areas 65, which is red light, is focused by lens 72 upon the opaque areas between the transparent areas 77. Also, in the absence of a variable color diffraction grating with grating lines 21′ parallel to transparent areas 66 and 78, light transmitted by transparent areas 66, which light will be in the blue and green region, is focused upon the opaque areas between the transparent areas 78. Thus, no light is transmitted by the second masking means to a projection 80.

When there is a diffraction grating with grating lines 22′, it diffracts through areas 77, some of the red light transmitted by areas 65, the amount depending upon the amplitude of the red diffraction grating. This light is then projected by a projection lens 81 onto the projection screen 80. In a television application, this red diffraction grating has an amplitude corresponding point-by-point with the red color intensity of the televised scene. Thus, the red light projected on screen 80 is an image of the red light in the televised scene.

Similarly, if there is a variable color diffraction grating in medium 12, it diffracts through areas 78, the light transmitted by transparent areas 66 as a function of the amplitude and grating spacings of the variable color diffraction grating. This transmitted variable color when projected on the projection screen 80 produces, with the red light, a full color picture.

Some of the advantages of the present invention can now be understood on the basis of the above explanation. It has been shown that the red diffraction grating diffracts only red light since the areas 65 that are parallel to the red grating lines 22′ transmit only red light. Since only one color is diffracted, the red light optics may be the same as the optics for a simple black and white diffraction system. That is, the areas 65 and 77 can be made as wide as they would be in a black and white diffraction system. With these areas being wider, they transmit more light which not only increases the intensity of the projected light but also permits the use of fewer areas 65 and 77. This, in turn, simplifies the construction of the first and second masking means. Also, the grating lines 22′ for the red diffraction grating can be as widely spaced as the grating lines for the diffraction grating in a black and white diffraction system. The increase in permissible grating spacing means that the resolution of these grating lines may be less than in prior color systems. It follows then that the resolution of the electron beam in the electron writing system may be less than was formerly required for a color projection system. There is another advantage. Since the red diffraction grating diffracts only red light, the light it diffracts through area 77 always has a high red color purity. This is in contrast to prior color systems in which a red diffraction grating diffracted some green light from the second order diffraction pattern through the transparent areas in the second masking means. This green light desaturated the projected red light. But in the present system, the red diffraction grating diffracts only red light through the transparent areas 77 in the second masking means.

The above-mentioned advantages for the red optics are obtained for the variable color optics but to a lesser degree. The variable color optics must still distinguish between several colors as in the prior color systems and thus cannot be the simple black and white optics. However, the number of colors between which the variable color optics must distinguish has been reduced since there is no red light. Thus, the areas 66 and 78 can be made wider and the resolution of the variable color grating lines 21′ can be made less than in the prior color projection systems. Since areas 66 and 78 must be made narrower than the transparent areas 65 and 77, more of the transparent areas 66 and 78 are required to transmit the same amount of light transmitted by areas 65 and 77.

A discussion of the determination of the widths and positions for the transparent areas 65 and 77, as well as the parameters of the red diffraction grating lines 22′, will not be presented here since they are the same as for a black and white diffraction projection system.

The positions and widths for the transparent area 66 and 78, as well as the grating spacings for the variable color diffraction grating, can be determined from the diffraction equation:

$$n\lambda/s=d/l$$

as is explained in my aforementioned copending application, Serial No. 782,955, filed December 24, 1958, and assigned to the assignee of the present invention. In this equation, "$n$" is the order of the diffraction pattern from which light is used, "$\lambda$" is the wavelength of the light under consideration, "$s$" is the grating spacing of the diffraction grating corresponding to this light, "$l$" is the distance from the modulating medium 12 to the second masking means, and "$d$" is the distance from the point on second masking means at which the zero order diffracted light is focused to the point on the second masking means at which the light under consideration is diffracted.

In FIG. 3, there is illustrated a reflection-type embodiment of my invention in which a fixed type modulating medium 85, such as a transparent oil, is utilized. However, as regards the optical part of this embodiment, a movable medium such as the thermoplastic medium 12, illustrated in FIGS. 1 and 2, can be used instead. There are many suitable materials for modulating medium 85, including beeswax, methyl silicon fluids and other materials described and claimed in my copending application Serial No. 708,528, filed January 7, 1958, Patent No. 2,943,147, dated June 28, 1960, and which is assigned to the assignee of the present invention.

In FIG. 3, polychrome light is produced by the light source 61 and focused by mirror 62 upon a preferably square aperture 86 and an opaque frame 88. The size of the image projected on screen 80 is dependent upon the size of aperture 86. Between the light source 61 and frame 88 there is a filter and mirror arrangement comprising centrally arranged dichroic mirrors 89 on both sides of which are two plane mirrors 90. All four mirrors are of the same size and are preferably arranged at a 45° angle with the axis of the system. Dichroic mirrors 89 transmit red light while reflecting cyan light, which in turn is reflected by mirrors 90. Due to this mirror arrangement, the light focused on aperture 86 by mirror 62 comprises a center strip of red light that is twice as wide as either of the two side strips of cyan light.

The light transmitted by aperture 86 projects, after transmission through a lens system 92, is incident on a masking means comprising a plurality of reflecting curved bars arranged in three sets 93, 94, and 95. The red light is incident on set 94 and the cyan light on sets 93 and 95. The light reflected from these bar sets is focused by lens system 92 on medium 85 in a direction parallel to the respective bars from which the light reflects. This light is then reflected back onto these bar sets by a mirror 97, illustrated as a grounded conducting spherical mirror, positioned beneath modulating medium 85.

An optical system utilizing curved reflecting bars is described and claimed in my copending application, Serial No. 782,957, filed December 24, 1958, now Patent No. 2,995,067, dated August 11, 1961, and which is assigned to the assignee of the present invention.

When a red diffraction grating is formed in medium 85 with grating lines parallel to the center line of bar set 94, it diffracts red light through the transparent areas 98 between and at the sides of the bars 100. Similarly, a variable color diffraction grating with grating lines parallel to the bars 102 and 103 of bar sets 93 and 95, respectively, diffracts the desired variable color through transparent areas 105 and 106 between these bars 102 and 103.

The factors for determining the sizes and positions of the transparent areas as well as the reflecting bars in the masking means of FIG. 3 are basically the same as those previously described with reference to the system of FIG. 2. However, in FIG. 3 these factors must be altered due to the tilt of the masking means with respect to mirror 97. This tilt is required for the reflection of light onto the modulating medium 85.

There is another variation in utilizing the previously mentioned considerations, which variation results from the single masking means in FIG. 3 performing the functions of the two masking means in FIG. 2. By light reflection from bars 100, and from bars 102 and 103, the same effect is produced as by the transmission of light by, respectively, the transparent areas 65 and 66. Also, these bars mask the light as does the second masking means in FIG. 2.

Behind each of the two reflecting bars 100 a virtual image is formed of the red light transmitted at the center of aperture 86. The widths of these virtual light sources at the mid points of bars 100, should be approximately equal to the widths of the transparent areas 65 in the first masking means in FIG. 2. These widths are determined by the condensing action of lens system 92 as well as the curvature of bars 100. Similarly, for the center bars 102 and 103, of sets 93 and 95, the widths of the virtual light sources produced behind these center bars are approximately equal to the widths of the transparent areas 65. The curvatures of the bars are different at different portions of the masking means due to the difference in magnification factor for the mirror 97 to different parts of the masking means, as is explained in my aforementioned copending application, Serial No. 782,955.

Near the center of bars 100, the widths of the transparent areas 98 between bars 100 should be approximately equal to the widths of the transparent areas 77 in the second masking means in FIG. 2. Similarly, near the center of the masking means, the widths of the transparent areas 105 and 103 should be approximately equal to the widths of the transparent areas 78 in the second masking means of FIG. 2.

As explained in my aforementioned copending application, Serial No. 782,955, the masking means should be positioned on the focal surface of mirror 97 or the closest surface thereto.

Since the function of the masking means in FIG. 3 is similar to the operation of the first and second masking means in FIG. 2, red light reflected from bars 100 is reflected by mirror 97 back onto bars 100 when there is no red diffraction grating in medium 85. When there is a red diffraction grating, it diffracts red light, the magnitude depending upon the amplitude of the red diffraction grating, through the transparent areas 98. Likewise, the cyan light reflected from the bars 102 and 103 is focused back onto these bars by mirror 97 when there is no variable color diffraction grating in medium 85. When there is a variable color grating, it diffracts through transparent areas 105 and 106, light the amplitude of which is a function of the grating amplitude, and the hue of which is a function of the variable grating spacing.

The light transmitted by this masking means is projected by lens system 81 onto projection screen 80 after reflection from a mirror 108 which deflects the light through an angle of 90°. This deflection by mirror 108 permits placement of screen 80 parallel with the main axis of this projection system.

The electron writing system for forming the red and variable color diffraction gratings in medium 85 is essentially the same as that described in FIG. 1. However, since the modulating medium does not move, there must be some means provided for vertically deflecting the electron beams.

The vertical deflection system is illustrated as comprising two deflection plates 110 arranged on opposite sides of the electron beam paths, and which are supplied with a deflection signal from a vertical deflection signal source 111. The deflection signal is converted into push-pull form by a push-pull amplifier 112, and then one of the push-pull signals is added, in an adder circuit 114, to the $Y-R$ modulated carrier signal from source 47.

In the embodiment of FIG. 1, separate deflection plates were provided for the insertion of the $Y-R$ modulated carrier signal information. However, in the writing system of FIG. 3, such deflection plates are required anyway for vertical deflection and thus the $Y-R$ modulated carrier signal can be applied to these vertical deflection plates.

The $Y-R$ modulated carrier signal does not cause defocusing of the electron beams, as it did in the FIG. 1 system, since in FIG. 3 it does not affect the beams until after they have been focused. But, a similar result is obtained as with defocusing since the $Y-R$ modulated carrier signal causes the electron beams to oscillate in a vertical direction and thus causes the charge lines, corresponding to the variable color charge pattern, to spread as a function of the sum of the blue and green video signals.

The remainder of the structure of the electron writing system illustrated in FIG. 3 is identical to that described in FIG. 1 and thus will not be further described.

The advantages previously mentioned with respect to the system of FIG. 2 are also obtained with the system of FIG. 3. That is, the transparent areas 98, 105 and 106 are larger than in a color projection system in which the masking means must separate out more colors. Likewise, the sizes of the virtual images formed by the bars 100, 102, and 103 are larger. Also, there is no desaturation of the red color since the red diffraction gratings diffracts only red light. And further, the resolution requirements of the electron beam are less.

In FIGURE 4 is shown another embodiment of my invention in which the green component of color information is contained in one set of diffraction gratings and the remainder of the color information, namely magenta, is contained in an orthogonally arranged set of diffraction gratings. Only the electron beam system and control therefor have been illustrated since the projection system is the same as that shown in FIGURE 3 except that the mirrors corresponding to dichroic mirrors 89 transmit green light and reflect magneta instead of red light and cyan respectively, as in the projection system shown in FIGURE 3.

In FIGURE 4 the electron beam producing system is similar to that shown in FIGURE 3 and corresponding parts have been designated by the same reference numerals. As will become apparent from the subsequent description the beam splitter electrodes 30 and 32 are not required and anode 29 is the only remaining electrode of the assembly 15. A focused beam of electrons having an intensity determined by the bias voltage of source 27 is provided. The electron beam passes between horizontal deflection plates 52 and vertical deflection plates 110 which are energized to scan the beam over an area of the deformable medium 85. The color information relating to the red and blue color components is superimposed upon the amplified output of the horizontal deflection signal source 111. As illustrated schematically, this circuit includes the horizontal deflection plates 52 energized by the resultant voltage of the horizontal deflection source 111 amplified by amplifier 111′ and the sum of the red and blue information containing voltages impressed on the adder circuit 112 by the output conductors 113 and 114 of the modulators 115 and 116. The modulator 115 produces a voltage having a frequency corresponding to that of the oscillator 117 and an amplitude corresponding to the amplitude of the red video signal provided by the red video source 118 which is available, for example, in a television camera or television receiver circuit. In a similar manner, the modulator 116 produces an output voltage having a frequency depending upon the frequency of oscillator 119 and amplitude depending upon the amplitude of the blue video signal provided by source 120.

The color information of the voltages on conductors 112 and 113 appears in the diffraction pattern established on the medium 85 since the horizontal sweep is velocity modulated by these voltages to produce a corresponding charge pattern. The frequency of oscillators 117 and 119 determine the spacing of the lines of charge and as a result of the grating spacings. The frequencies are chosen so that, with the established parameters of the electron beam and optical systems the deformations due to the red video signal result in projected red light and the deformations due to the blue video signal result in blue projected light.

Deformations in the form of a diffraction pattern orthogonal to that produced by color information containing voltages impressed on the horizontal deflection plates 52 are produced by a similar circuit but containing only green video information. This circuit includes the vertical deflection voltage source 121, connected to the deflection plates 110 through amplifier 122 and the adder circuit 123 for adding the amplified deflection voltage to the green video information containing voltage appearing on conductor 124. Conductor 124 is the output of modulator 125 which produces a voltage having the frequency of oscillator 126 and an amplitude corresponding to the amplitude of the green video signal source. The green color information is essentially a groove along the raster line having a depth varying with the intensity of the green color component to be projected. Since maximum depth corresponds to maximum intensity and also to minimum vertical deflection or smearing of the beam it is necessary that the green video signal be an inverted signal i.e., a signal of maximum amplitude for minimum green intensity and vice versa.

It is apparent from the above that the deformations caused by the superposition of red and blue color information on the horizontal deflection are spaced along the raster line in accordance with the frequency of the oscillator 117 and 119, and the deformation produced by the green color information is a groove having edges generally parallel to the raster line and a depth dependent upon the intensity of the green color signal. Since the green diffraction and cooperating masking system is not used for color selection the frequency of oscillator does not need to bear a direct relation to the frequency of oscillators 117 and 119 and will to advantage operate at a substantially higher frequency such as fifty megacycles. The embodiments of the present invention described above indicate that, in its broader aspects, it is applicable to both moving tape modulating mediums and stationary deformable mediums. It is also applicable to transmission and reflection type systems and to systems in which the diffraction pattern containing color information relating to more than one color component is produced as a single pattern of variable spacing, in other words, in what may be termed a variable color or a pattern which is the resultant of superimposed and simultaneously formed diffraction patterns of different wave lengths corresponding to different color components.

In a generic sense the present invention relates to a system having orthogonal diffraction patterns, one of which is utilized for the intensity of one color component and is illuminated by only light of that color, whereas, the other orthogonally positioned diffration grating is utilized for both color component and intensity determination and in cooperation with the masking system employed therewith controls both the intensity and color of the light which is to be added to the single color component controlled by the other diffraction pattern to produce the desired projected light pattern.

While the invention has been described with respect to particular illustrated embodiments it will be appreciated by those skilled in the art that changes and modifications may be made without departing from my invention in its broader aspects and I aim therefore in the appended claims to cover all such changes and modifications as fall within the true spirit and scope of my invention.

What I claim as new and desire to secure by Letters Patent of the United States is:

1. A system for projecting colored light as a function of the color information contained in orthogonally arranged diffraction patterns in a light modulating medium wherein one of said gratings contains intensity information corresponding to one color component and the other of said diffraction gratings contains both the color component and intensity information of the remaining colored light to be projected comprising first and second light masking systems operatively associated respectively with said orthogonally arranged diffraction gratings of said light modulating medium, means illuminating the light masking system associated with said one of said diffraction gratings with light having only the color of said one component and means illuminating the light masking system associated with the other of said diffraction gratings with light including the remaining colored light, both of said light masking systems blocking undiffracted light and said first masking system passing light of said one color component with an intensity varying in accordance with the intensity information in said first diffraction grating and said second light masking system passing light having a color and intensity determined by the color and intensity information of the second of said orthogonally arranged diffraction gratings.

2. A system for projecting colored light as a function of the color information contained in orthogonally arranged diffraction gratings in a light modulating medium wherein one of said gratings contains intensity information corresponding to one color component and the other of said diffraction gratings contains both the color component and intensity information of the remaining colored light to be projected comprising first and second light masking systems operatively positioned respectively with said orthogonally arranged diffraction gratings of said light modulating medium and controlling conjointly therewith the colored light projected by said system, means illuminating one of said light masking systems with light having only the color of said one component and means illuminating the other of said light masking systems with light including the remaining colored light, both of said light masking systems blocking undiffracted light and said first masking system passing light of said one color component with an intensity varying in accordance with the intensity information in said first diffraction grating and said second light masking system passing light having a color and intensity determined by the color and intensity information of the second of said orthogonally arranged diffraction gratings.

3. The system of claim 2 wherein said one color component is green and the remaining color light is magenta.

4. A color projection system for projecting colored light as a function of the parameters of first and second orthonally arranged diffraction gratings in a light modulating medium, said system comprising means for producing a first and a second set of line sources of light—providing light incident on said light modulating medium, wherein said first set of line sources is parallel to the grating lines of said first diffraction grating and the said second set of line sources is parallel to the grating lines of said second diffraction grating, and wherein the light in said first set of line sources is of only one color component and the light in said second set of line sources includes substantially the remaining components of white light whereby light from said first set of line sources is diffracted substantially only by said first diffraction grating and light from said second set of line sources is diffracted substantially only by said second diffraction grating, and a light masking means positioned to mask the light diffracted by said first and second diffraction gratings, said light mask having first and second sets of longitudinally-extending transparent areas arranged parallel, respectively, with said first and second sets of line sources of light whereby light diffracted by said first diffraction grating is transmitted substantially only by said first set of transparent areas and light diffracted by said second diffraction grating is transmitted substantially only by said second set of transparent areas, said light masking means and said light modulating medium conjointly controlling only the intensity of said first color component and both the intensity and color of the remainder of the projected light.

5. The color projection system as defined in claim 4 wherein the color of said first set of line sources is red and the color of said second set of line sources is cyan.

6. The color projection system as defined in claim 4 wherein the color of said first set of line sources is green and the color of said second set of line sources is magenta.

7. A color projecting system for projecting colored light as a function of the parameters of first and second orthogonally arranged diffraction grating in a light modulating medium, said system comprising means for producing a longitudinally extending source of substantially only one colored light and a longitudinally extending source of polychrome light different from said one colored light wherein the longitudinal dimension of said one colored source is substantially parallel to the grating lines of said first diffraction grating and the longitudinal dimension of said different colored light source is substantially parallel to the grating lines of said second diffraction grating, whereby the one colored light is diffracted substantially only by said one diffraction grating and said different colored light is diffracted substantially only by said second diffraction grating, and light masking means positioned to block undiffracted light and cooperating with said first and second diffraction gratings to project light of said one color having the intensity only determined by said first diffraction grating and to project light from said polychrome source having a resultant color and intensity dependent upon the parameters of said second diffraction grating.

8. A system for projecting colored light as a function of the color information contained in orthogonally arranged diffraction gratings in a light modulating medium wherein one of said gratings contains intensity information corresponding to one color component and the other of said diffraction gratings contains both the color component and intensity information of the remaining colored light to be projected comprising first and second light masking systems operatively positioned respectively with said orthogonally arranged diffraction gratings of said light modulating mediums and controlling conjointly therewith the colored light projected by said system, a source of substantially white light and a dichroic system for illuminating the light masking system associated with said one of said diffraction gratings with light having only the color of said one component and the light masking system associated with the other of said diffraction gratings with light including the remaining colored light components of said source, both of said light masking system blocking undiffracted light and said first masking system passing light of said one color component with an intensity varying in accordance with the intensity information in said first diffraction grating and said second light masking system passing light having a color and intensity determined by the color and intensity information of the second of said orthogonally arranged diffraction gratings.

9. The system of claim 8 wherein said one color component is green and the remaining colored light is magenta.

10. A system for projecting colored light on a screen as a funcion of the color information containing in orthogonally arranged diffraction gratings in a light-modulating medium wherein one of said gratings contains only intensity information corresponding to one color component and the other of said diffraction grating contains both the color component and intensity information of the remaining colored light to be projected comprising first and second light masking means operatively associated respectively with said orthogonally arranged diffraction gratings of said light modulating medium, both of said light masking systems blocking undiffracted light, said first masking system having light transmitting portions dimensioned to pass white light in an amount determined by the intensity information contained in said one diffraction grating and said second masking system having light transmitting portions dimensioned to determine both the color and intensity of the transmitted light in accordance with the color and intensity information of said other diffraction grating means for illuminating said modulating medium so that light diffracted thereby and transmitted by said first and second masking means is focused on said screen and means in the path of the light diffracted by said one diffraction grating for transmitting only light of the color component corresponding to said one diffraction pattern.

11. Apparatus for projecting a color image corresponding to the information contained in a light modulating medium in the form of orthogonally disposed superimposed light controlling deformations with the deformations extending in one direction having an amplitude dependent upon the intensity of one color component and the light controlling deformations extending in an orthogonal direction comprising diffraction gratings having spacings determined respectively by other color components impressed on said medium and amplitudes corresponding respectively to the intensities of said other color components, said light projecting system comprising light source means providing the color components to be projected, means establishing two different light paths from said light source means to the image to be projected, each of said light paths including the same area of said light modulating medium, light transmission limiting means for passing light in one of said paths having only said one color component and for passing light in the other of said paths having at least the colors of said other color components, light masking means in each of said light paths for preventing the projection of light from said light source means to the image area when said medium is undeformed, the light masking means in said one of said paths cooperating with said light controlling deformations corresponding to said one color to determine only the intensity of the light projected by said one light path, and the light masking means in the other of said light paths cooperating with said orthogonally arranged deformations to determine by diffraction both the color and intensity of the light transmitted by the other of said light paths.

12. Apparatus for projecting a color image corresponding point by point to the information contained over an area of a light modulating medium in the form of orthogonally disposed superimposed light controlling deformations with the deformations extending in one direction having an amplitude dependent upon the intensity of the green content of the image to be projected and the light controlling deformations extending in an orthogonal direction comprising diffraction gratings having spacings determined respectively by the red and blue content of the image to be projected and amplitudes corresponding respectively to the intensities of red and blue, said optical system comprising light source means providing the color components to be projected, means establishing two different light paths from said light source means to the image to be projected, each of said light paths including the same area of said light modulating medium, light transmission limiting means for passing only green light in one of said paths and for passing at least red and blue light in the other of said paths, light masking means in each of said light paths for preventing the projection of light from said light source means to the image area when said medium is undeformed, the light masking means in said one of said paths cooperating with said light controlling deformations corresponding to green to determine the intensity only of the green light projected, and the light masking means in the other of said light paths cooperating with said orthogonally arranged deformation to determine by diffraction both the color and intensity of the light transmitted by the other of said light paths.

13. Apparatus for projecting a color image corresponding to the information contained in a light modulating medium in the form of orthogonally disposed superimposed light controlling deformations with the deformations extending in one direction having an amplitude dependent upon the intensity of one color component and the light controlling deformations extending in an orthogonal direction comprising diffraction gratings having spacings determined respectively by other color components impressed on said medium and amplitudes corresponding respectively to the intensities of said other color components, said light projecting system comprising light source means providing the color components to be projected, means including light transmission limiting means for establishing three different light paths from said light source means to the image to be projected, each of said light paths including the same area of said light modulating medium and said light transmission limiting means passing light in at least one of said paths having only said one color component and for passing light in the other of said paths having at least the colors of said other color components, light masking means in each of said optical paths for preventing the projection of light from said light source means to the image area when said medium is undeformed, the light masking means in said one of said light paths cooperating with said light controlling deformations corresponding to said one color to determine the intensity only of the light projected by the first mentioned one of said paths, and the light masking means in the other of said light paths cooperating with said orthogonally arranged deformations to determine by diffraction both the color and intensity of the light transmitted by the other of said optical paths, said light masking means lying in side by side relation with the light masking means cooperating with the light controlling deformations extending in one direction lying between the light masking means cooperating with the light controlling deformations extending in the orthogonal direction.

14. Apparatus for projecting a color image on an image area corresponding to electrical color signals which comprises a deformable light modulating medium providing a raster area, means producing an electron beam impinging on said medium and means for horizontally and vertically deflecting said beam over said raster area, means velocity modulating the horizontal deflection of said beam at frequencies determined by two color components represented by said signals and amplitudes corresponding to the intensities of those color components to provide diffraction gratings extending substantially perpendicular to the direction of the raster lines having spacings corresponding to said two color components and amplitudes depending upon the intensities of said two color components, means for wobbling said beam in a vertical direction as it is deflected horizontally at a frequency which is high compared to the frequency at which the beam is velocity modulated in a horizontal direction and by an amount inversely proportional to the intensity of a third color component represented by said signals to provide a light controlling deformation extending along said raster line having a depth corresponding to the intensity of said third color component, means for illuminating said raster and image areas with light containing all of said color components and means including light masking means in the optical path between said light source and the image area for preventing light from reaching said image area when said medium is undeformed, said light masking means cooperating with the diffraction gratings extending normally to the raster lines to determine by diffraction the light projected to the image so that it corresponds to said two color components and the light masking means cooperating with the deformations of said medium extending along said raster lines determining the intensity only of the light projected to the image area corresponding to said one color component and means operative independently of said light modulating medium for limiting the light transmitted in the optical path including said last-mentioned light masking means to said one color component.

References Cited in the file of this patent

Meyer: "The Diffraction of Light, X-Rays, and Material Particles," 1949; published by J. W. Edwards, Ann Arbor, Michigan; page 132.

Television, by Zworykin and Morton, 2nd ed.; John Wiley and Sons, Inc., New York; page 445.